UNITED STATES PATENT OFFICE.

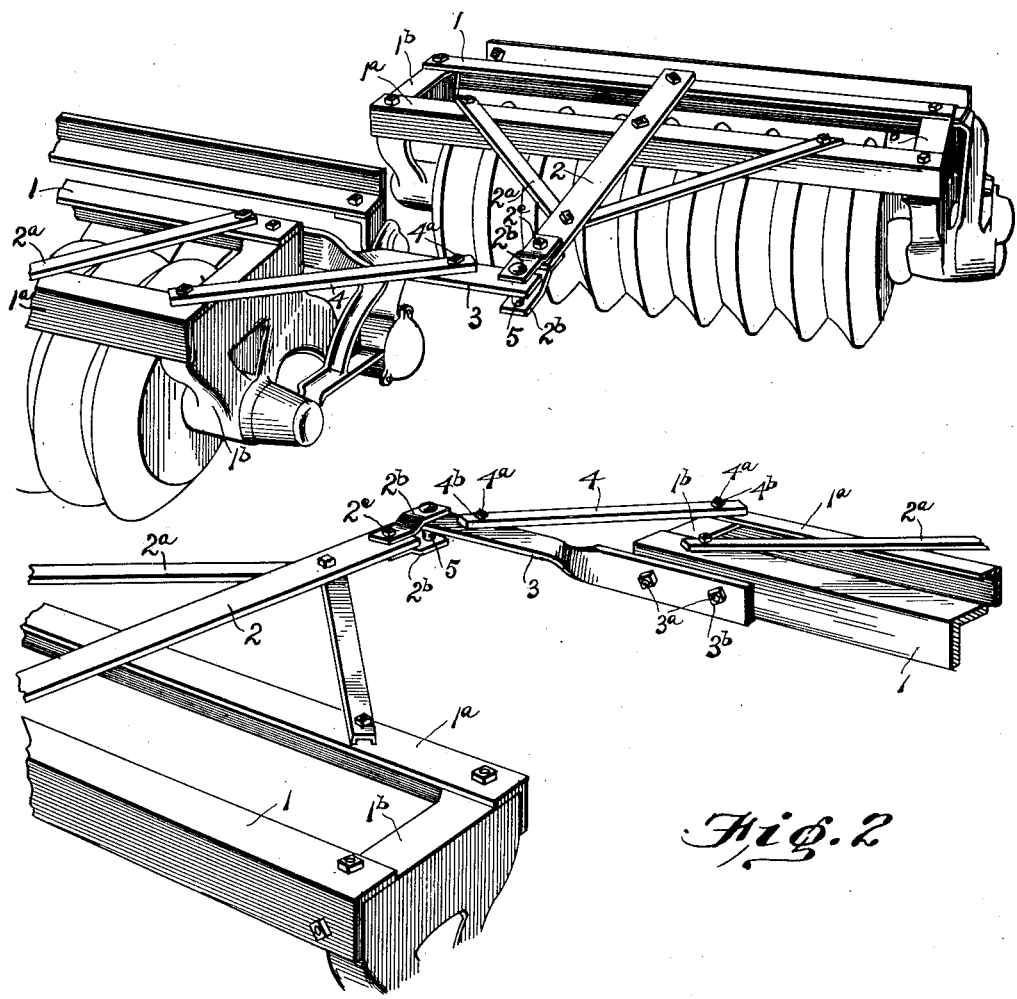

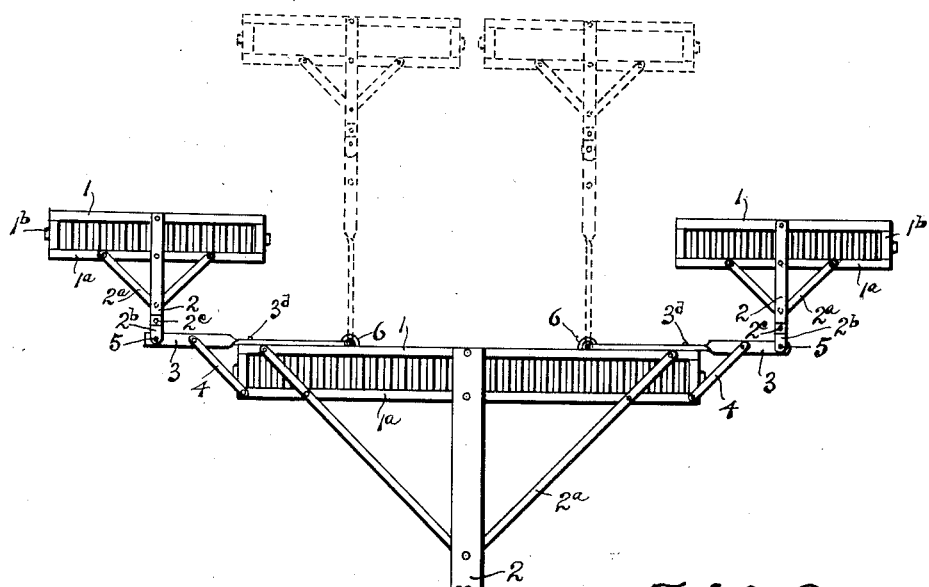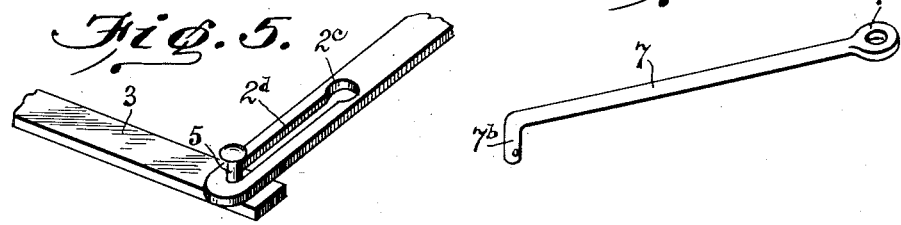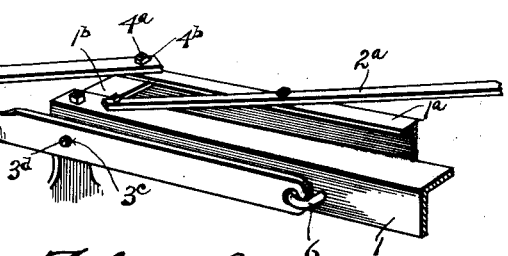

EARL J. POWELL, OF BEREA, OHIO, ASSIGNOR TO THE DUNHAM COMPANY, OF BEREA, OHIO, A CORPORATION OF OHIO.

TANDEM IMPLEMENT.

1,344,819.     Specification of Letters Patent.      Patented June 29, 1920.

Application filed August 6, 1919. Serial No. 315,746.

*To all whom it may concern:*

Be it known that I, EARL J. POWELL, a citizen of the United States, residing at Berea, in the county of Cuyahoga and State of Ohio, have invented certain new and useful Improvements in Tandem Implements, of which the following is a specification.

My invention relates to improvements in tandem implements, and more particularly to an improved coupling or draft appliance for such implements.

The invention relates more particularly to that particular type of tandem implement in which the rear or trailing units are arranged at one side of and to the rear of the front or main draft unit.

The improved coupling is adapted to be readily attached to or detached from the ends of the frame of the front unit forming extensions therefor, and connecting the same to the centrally located draft members of the rear or trailing units.

By the use of the improved draft couplings or extensions a single unit implement may be readily transformed into a tandem implement by the addition of other implement units or sections as trailers.

A further and very important object of the invention is the provision of improved laterally extending couplings adapted to be readily detached from the ends of the frame of the front or main draft section to permit the detachment of the trailers in storage or shipment, as well as to permit the implement units to pass through ordinary passages such as gates, of standard width, and the like.

A still further and very important object of the invention is the provision of an improved trailer or tandem coupling adapted to be flexibly attached to the ends of the main or front draft implement for holding the trailers in their normal or stepped position relative thereto and provided with means whereby such laterally extending coupling members may be readily detached at their outer or free ends to swing rearwardly with the trailing implements and bring the latter into true trailing position within the path of the front or main draft implement, as in passing through standard passage openings, and through gates or openings in transporting from one field to another.

With the above mentioned and other ends in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1, is a front perspective view of one of the improved tandem or trailer couplings as applied to the front and trailer units or sections of a tandem implement of the soil pulverizer type.

Fig. 2, a rear perspective view of the same.

Fig. 3, a top plan view of a tandem implement embodying a modified form of tandem couplings, in which the inner ends of the draft bars thereof are flexibly attached to the rear of the frame of the front unit and the outer ends thereof are adapted to be detached, whereby the trailers together with the draft bars are permitted to swing rearwardly and inwardly to take a true trailing position in the path of the front unit, as indicated by dotted lines.

Fig. 4, a perspective view of one of the tandem couplings taken from the inner rear side thereof.

Fig. 5, a perspective view of a modified coupling connection between the trailer draft bar and the outer end of the laterally extending draft bar of the main or front draft unit.

Fig. 6, a perspective view of a modified form of locking element for detachably securing the outer ends of the laterally extending draft bars to the frame of the front unit and for permitting such draft bars and trailer bars and the trailers attached thereto to swing rearwardly in trailing position, as shown by dotted lines in Fig. 3.

Similar numerals of reference designate like parts throughout all the figures of the drawings.

While I have shown my improved draft or coupling appliance applied to or embodied in a tandem implement of the soil pulverizer or disk type, it will, of course, be obvious that the same may be readily used in connection with tandem or multiple unit implements of various specific forms.

The frame of the front draft section may be of any suitable and convenient form, and likewise the central draft portion thereof. In the present instance the frame of the front draft section comprises a rear longitudinally extending bar 1, and a front transverse bar 1ª, connected to bearing brackets 1ᵇ, the latter being connected to the ends of the bearing shaft carrying the pulverizing rollers or disks used in this particular form of implement.

In the present instance the front unit is provided with a central draft bar 2, the latter being provided with draft or brace members 2ª. The rear or trailer units are of similar form, being provided with frames made up of transverse bars 1 and 1ª, and brackets 1ᵇ, together with central draft members 2, and draft or brace members 2ª.

Referring now to the improved coupling device to which this invention particularly relates, it will be seen that the ends of the frame of the front unit are provided with laterally extending draft members embodying a main draft bar 3, attached to the rear of the rear bar 1, of the frame of the front unit and projecting laterally therefrom, and as a means of securing the outer end of the draft bar or arm 3, in its normal or projecting position, as well as bracing the same, the outer end of the frame of the front unit is provided with a second bar 4, said bar or element 4, in the form shown in Figs. 1 and 2, of the drawings, being adapted to act as a draft or reach bar, and in the form shown in Figs. 3 to 6, inclusive of the drawings, being adapted to act as a locking device or member in holding the draft bar 3, forwardly in its normal or operative position hereinafter explained.

As a means of flexibly connecting the rear or trailer units to the outer ends of the draft bar 3, the central draft bars 2, of the rear units are provided at their forward ends with suitable pivotal connections, said pivotal connections comprising a bearing pin 5, in the end of the draft bar 3, and connected to the central draft member 2, of the trailer in any suitable and convenient manner.

The bearing pin 5, may be mounted in spaced bracket members 2ᵇ, on the draft bar 2, and secured by means of a bolt 2ᶜ.

The relation of the bracket or clevis members 2ᵇ, with respect to the end of the draft bar 3, and the loose connection of the bearing pin 5, is such as to permit free movement between the draft members 2 and 3, as required in an implement of this class in passing over uneven ground or undulations of the surface being cultivated.

As a convenient means of quickly attaching the draft bar 2, of the trailer to the end of the coupling draft bar 3, the forward end of the central trailer draft bar 2, may be provided with a longitudinal slot 2ᵈ, the rear end of which is provided with an enlarged opening 2ᵉ, to receive the head of the bolt 5, so that when the connection or coupling is effected the bearing bolt 5, will be in the forward end of the slot and the draft bar 2, will be securely retained thereon, as illustrated in Fig. 5, of the drawings.

As a means of detachably connecting the coupling members 3 and 4, to the ends of the frame of the front units, suitable bolts 3ª, may be passed through suitable openings in the rear bar 1, and connected by nut 3ᵇ, and the second bar or member 4, may be secured by bolts 4ª, provided with nuts 4ᵇ. In this way it will be seen that the members 3 and 4, of the coupling appliance may be quickly attached to and detached from the ends of the frame of the front unit or section.

As a means of flexibly and detachably connecting the draft bars 3, to the ends of the frame of the front unit or section whereby the trailer units will be carried in their normal working positions, as shown in Fig. 3, of the drawings, and whereby such draft bars 3, together with the trailers may be permitted to swing rearwardly and inwardly to assume a trailing position within the path of the front unit or section, as shown by dotted lines in said Fig. 3, of the drawings, in passing through gates or doors, the inner ends of the draft bars 3, may be extended slightly and pivotally or flexibly connected to the rear of the rear bar 1, of the front section, as for example,—by means of U-bolts 6, detachably secured to the rear bar and as a means of holding the outer ends of the bars 3, in proper relative position, the outer ends of the bars may be provided with openings 3ᶜ, adapted to take over stud bolts or projections 3ᵈ. As a means of bracing or locking the free ends of draft bars 3, in their forward or working positions, locking bars or members 4, may be provided, and secured in a manner similar to that hereinbefore described, or if desired, such locking or bracing element may take the form of a hook member consisting of a main bar 7, terminating at one end in an eye 7ª, and at the other in a hook 7ᵇ, one end of said locking bar 7, being adapted to be secured by means of a bolt and nut 4ª and 4ᵇ, and the opposite end or hook 7ᵇ, being adapted to extend into the bolt opening of the bar 3, and be secured by means of a securing pin, such as a cotter pin or the like, and in an obvious manner.

Having thus described some of the embodiments of my invention, what I claim and desire to secure by Letters Patent, is,—

1. A draft appliance for tandem implements, comprising a projecting draft arm detachably connected to the rear of the front implement, a reach bar detachably connected to the latter and the outer projecting end of said draft arm, and a trailer having a central draft bar detachably and flexibly connected to said draft arm.

2. A coupling for tandem implements, comprising a laterally projecting draft member detachably connected to the front unit, a second draft member detachably connecting the latter to the projecting end of said draft arm, and a trailer flexibly and detachably connected to the free end of said draft member, said connection comprising a bearing pin on the latter and a trailer draft bar loosely connected to said bearing pin.

3. In a tandem implement, the combination with a forward section having laterally extending detachable draft members; of trailer sections arranged in stepped relation thereto and provided with central forwardly extending draft members flexibly and detachably connected to the ends of said laterally extending draft members of said forward section.

4. A coupling for tandem implements of the roller type, comprising a laterally extending draft arm detachably connected to the front roller unit, a reach bar detachably connected to the latter and the outer end of said draft arm, and a trailer draft appliance flexibly and detachably connected to the outer end of said draft arm.

5. A draft appliance for tandem soil pulverizing implements, comprising a laterally projecting draft arm detachably connected to the front implement frame, a detachable reach bar on the latter detachably connected to the projecting end of said draft arm, and a trailer provided with a central forwardly extending draft member flexibly and detachably connected to the outer end of said draft arm.

6. In a tandem implement, the combination with a front unit, and rear units arranged in echelon; of laterally projecting draft appliances attached to the ends of the front unit and adapted to swing to the rear thereof, and draft members on the trailing units flexibly connected to the free ends of said laterally projecting draft appliances.

7. In a tandem implement, the combination with the forward section having laterally extending draft members detachably connected therewith; of trailer sections arranged in stepped relation thereto and provided with forwardly extending draft members flexibly and detachably connected to the outer ends of said laterally extending draft members.

8. In a tandem implement, the combination with a front unit, and two rear units arranged in echelon; of laterally projecting draft appliances attached to the front unit and adapted to take a position at the rear thereof in the path of the latter, and central draft members on the trailing units flexibly connected to the ends of said laterally projecting draft arms.

9. In a tandem implement, a forward section including a draft frame, draft bars flexibly connected at their inner ends to the rear portion of said draft frame, means on said frame for securing said arms in their forward positions and for detaching the same to swing rearwardly in trailing position therefrom, and trailer implements connected to said draft arms whereby when the latter are secured in their normal working position the same will trail at the side of the path of said forward implement and when said draft arms are detached the latter and said trailing implements will assume a rearward position and traverse the path of said forward section.

10. In a tandem implement, comprising a forward section including a frame and a centrally located draft appliance, draft bars flexibly connected at their inner ends to the rear portion of said frame and projecting laterally therefrom, means on said frame for securing said arms in their forward projecting positions and for detaching the same to swing rearwardly in trailing position therefrom, and trailer implements flexibly and detachably connected to said draft bars whereby when the latter are secured in position the tandem implements will trail in stepped relation to said forward implement and when said draft arms are detached the latter and said trailing implements will assume a rearward position in the path of said forward section.

In testimony whereof I have affixed my signature.

EARL J. POWELL.